United States Patent
Walker

[15] 3,636,728
[45] Jan. 25, 1972

[54] SHAFT COUPLING
[72] Inventor: Ralph E. Walker, Los Angeles, Calif.
[73] Assignee: Litton Precision Products, Inc., Beverly Hills, Calif.
[22] Filed: Mar. 20, 1970
[21] Appl. No.: 21,372

[52] U.S. Cl. ................................................64/11 R, 64/31
[51] Int. Cl. .............................................................F16d 3/16
[58] Field of Search .....................64/11, 15 B, 27, 27 L, 31; 192/30

[56] References Cited

UNITED STATES PATENTS

| | | | |
|---|---|---|---|
| 729,649 | 6/1903 | Nyberg | 64/27 X |
| 1,756,689 | 4/1930 | Jenkins | 64/27 |
| 2,248,428 | 7/1941 | Kamenarovic | 64/15 |
| 2,295,348 | 9/1942 | Leach | 64/27 X |

*Primary Examiner*—Kenneth W. Sprague
*Attorney*—Alan C. Rose, Alfred B. Levine, Ronald W. Reagin, John G. Mesaros and Thomas A. Seeman

[57] ABSTRACT

A shaft coupling for precisely transmitting angular motion and position from one rotating input shaft to an eccentric measuring shaft. A flexible crossmember is radially mounted on one end of the measuring shaft and is held in sliding engagement in a pair of holes in a hub mounted on one end of the input shaft. As the input shaft is rotated, the flexible crossmember torques the measuring shaft at a constant rotational velocity with respect to the input shaft.

6 Claims, 5 Drawing Figures

INVENTOR.
RALPH E. WALKER

PATENTED JAN 25 1972
3,636,728
SHEET 2 OF 2
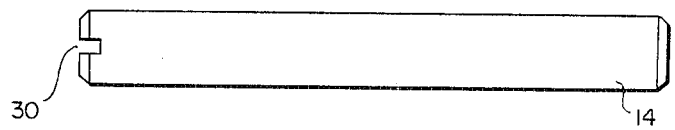
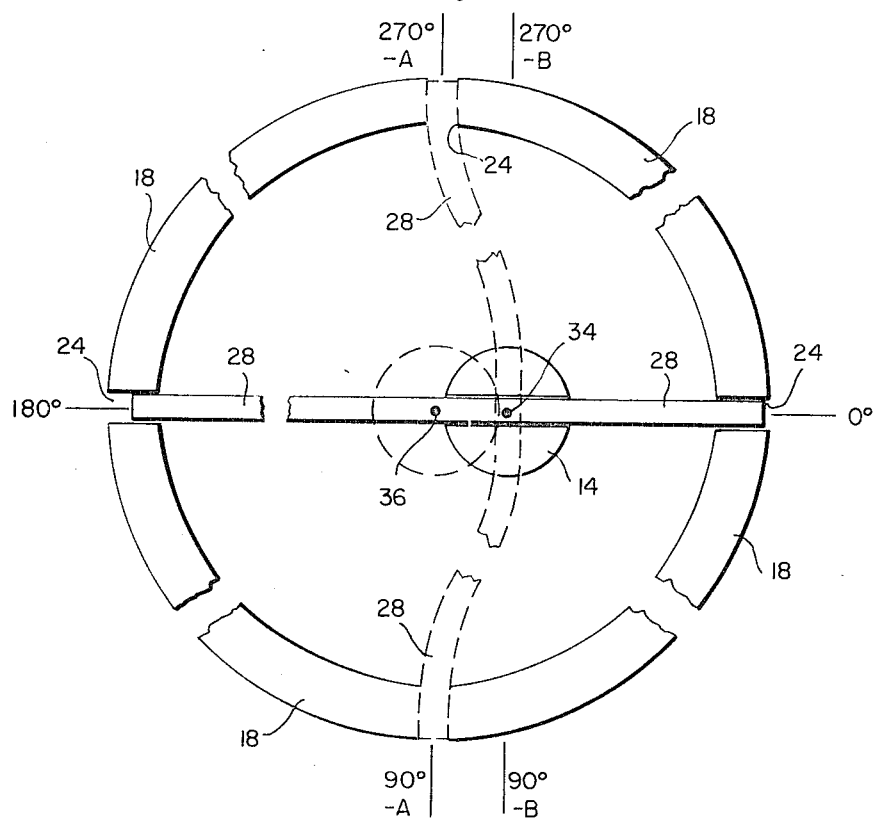
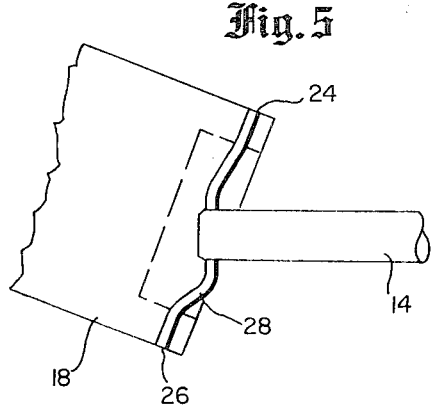
INVENTOR.
RALPH E. WALKER
BY
ATTORNEY

SHAFT COUPLING

BACKGROUND OF THE INVENTION

This invention pertains to the art of fabricating shaft couplings for transmitting angular motion and position from one rotating shaft to another.

In the prior art, one device for transmitting rotary motion from one shaft to another is a lathe dog. This type of device utilizes a radial arm on both the driving shaft and the measuring shaft. An axial member at the tip of the radial arm on the driving shaft urges the radial arm of the measuring shaft in rotary motion. Where two shafts are not exactly aligned, a lathe dog has the disadvantage of introducing cyclic error. During one half of the revolution the driving shaft will turn through a greater angle than the measuring shaft. Similarly during the other half of a revolution the driving shaft will turn through less of an angle than the measuring shaft.

A bellows shaft coupling is another known device for transmitting rotary motion from one shaft to another. The bellows coupling comprises a pair of hubs coupled by a flexible bellows. Two rotatable shafts are coupled by mounting one of the hubs on each shaft. Although a bellows-type shaft coupling will transmit angular motion without cyclic error, it is not without disadvantages. Space between the ends of the two shafts is required for the flexible bellows. The use of a bellows requires a minimum of approximately ⅜-inch space between the input and the measuring shafts. Where this amount of space is not available, a bellows is not usable. Also, flexible bellows are necessarily manufactured from expensive materials such as spring-tempered nickel.

The present invention overcomes the above and other disadvantages of prior shaft couplings by providing a shaft coupling which exhibits no backlash or windup (rotational deflection) in either direction and which exhibits a constant rotational velocity even though the two rotating shafts have a substantial axial or angular misalignment. Moreover, the instant shaft coupling has a high torque capacity, is lightweight, may be easily separated from the shafts and is economical to manufacture.

SUMMARY OF THE INVENTION

The shaft coupling of the invention comprises a hub for transmitting angular motion from a rotatable input shaft and a rotatable measuring shaft having a flexible radial crossmember mounted on one end. The hub has a bore for receiving an input shaft and setscrews for rigidly mounting the hub on the input shaft. The hub also has a pair of holes located in the diameter of the bore opposed 180 angular degrees for receiving the tips of the radial crossmember in sliding engagement. The purpose of the shaft coupling is to transmit constant rotational velocity from an input shaft to a measuring shaft even through the two shafts are angularly misaligned or are mounted with a slight eccentricity between their axes of rotation. Another purpose of the invention is to permit the measuring shaft to be mounted in a position nearly abutting the input shaft. As the input shaft rotates, the holes in the hub drive the crossmember to rotate the measuring shaft. When the measuring shaft is eccentric to the input shaft, either angularly or radially, the radial arms of the crossmember constantly flex and slide in relationship to the driving member. The radial arms are flexed evenly so that the measuring device is turned through an angle substantially equal to the angle of rotation of the input shaft.

It is the object of the invention to provide a shaft coupling for transmitting constant rotational velocity between two rotating shafts having a substantial axial misalignment.

It is a second object of the invention to provide a shaft coupling for transmitting angular rotational velocity between two rotating shafts having either a substantial axial or angular misalignment.

Another object of the invention is to provide a shaft coupling which requires a minimum amount of space between two coupled shafts.

A further object of the invention is to provide a shaft coupling which operates without windup or backlash in either direction.

Still another object of the invention is to provide a shaft coupling which is economical to manufacture.

Yet another object of the invention is to provide a shaft coupling which has a high torque capacity.

BRIEF DESCRIPTION OF THE DRAWINGS

The novel features which are believed to be characteristic of the invention, both as to its organization and method of operation, together with further objects and advantages thereof, will be better understood from the following description considered in connection with the accompanying drawings in which the invention is illustrated by way of example. It is to be expressly understood, however, that the drawings are for the purpose of illustration and description only, and are not intended as a definition of the limits of the invention.

FIG. 3 is a side view of the measuring shaft.

FIG. 4 is a functional diagram illustrating the operation of the shafted coupling of the invention when subjected to axial misalignment.

FIG. 5 is a section illustrating the operation of the shaft coupling when subjected to angular misalignment.

DESCRIPTION OF THE PREFERRED EMBODIMENT

Figure 1:
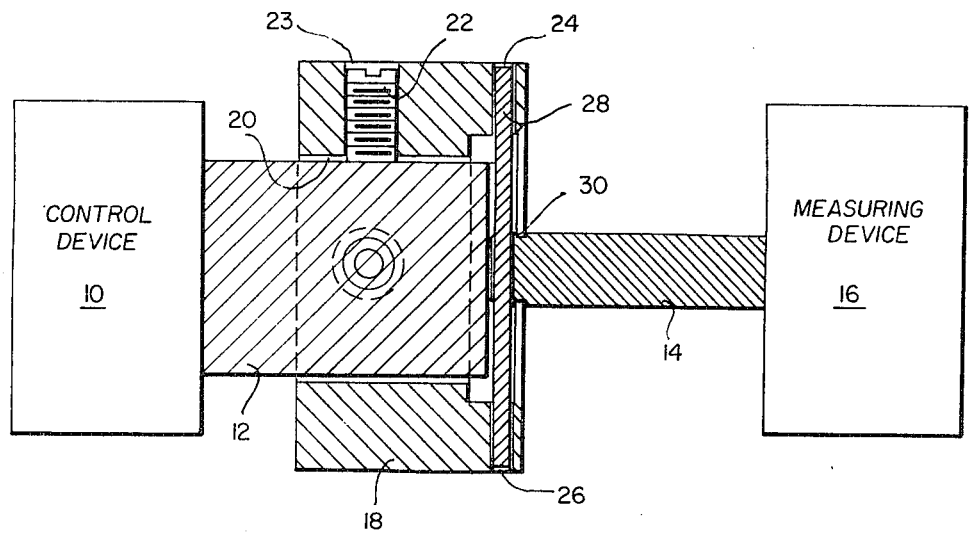
FIG. 1 is a section view of the coupling of the invention.

Control device 10 as shown in FIG. 1 may be any mechanical or electromechanical device which requires the transmission of rotary motion or position by means of an input shaft 12 to a measuring shaft 14. Measuring shaft 14 drives measuring device 16 which may be a shaft encoder, a synchro, a resolver, a servosystem or the like. Both input shaft 12 and measuring shaft 14 rotate freely in either direction. In order to obtain an accurate indication of angular motion or position from measuring device 16, measuring shaft 14 must precisely track the rotation of input shaft 12 throughout each revolution.

Hub 18 transmits the rotary motion of input shaft 12 to measuring shaft 14 without cyclic error even though there is a certain amount of parallel or angular eccentricity between input shaft 12 and measuring shaft 14. Parallel eccentricity occurs where the axes of rotation of input shaft 12 and measuring shaft 14 are parallel but axially offset. Angular eccentricity occurs when the axis of rotation input shaft 12 and measuring shaft 14 are angularly misaligned. Hub 18 is produced by standard machine shop practices. For example, the outside shape may be turned on a lathe, the bore drilled. Hub 18 has a bore 20 slightly larger in diameter than the diameter of input shaft 12. Hub 18 slips over the end of input shaft 12 and is held in place by setscrew 22 in threaded hole 23. Hole 23 may be formed by drilling and tapping. Although only one such screw is shown, in practice, it is advisable to use more than one setscrew spaced around hub 18. Hub 18 has a pair of drive holes 24 and 26 located in the diameter of bore 20 and are opposed 180°. Holes 24 and 26 may be formed by standard machining practice, for example, drilling and reaming.

Holes 24 and 26 are slightly larger in diameter than the diameter of pin 28 to hold pin 28 in sliding engagement as hub 18 revolves.

Alternatively, hub 18 may be mounted on input shaft 12 by means of a clamp or it may be affixed to input shaft 12 by means of an adhesive.

The diameter of pin 28 and the type of wire used to form the pin must be selected so that the coupling does not exhibit windup, i.e., rotational deflection, or excessive radial deflection on the bearings. If the wire is unduly weak, measuring shaft 14 will not begin to follow rotation of input shaft until pin 28 has tightened up in a springlike action. This type of error is known as windup or rotational deflection. If pin 28 is unduly strong, it won't flex as it is turned by hub 18. The length of pin 28 should be taken into account when selecting a wire diameter. For example, for a hub having an outer diameter of 0.70 inch, holes having a diameter of 0.0236 plus or minus 0.0002 inch, pin 28 is fabricated from a 0.022-inch hardened steel wire known as "music wire."

Figure 2:
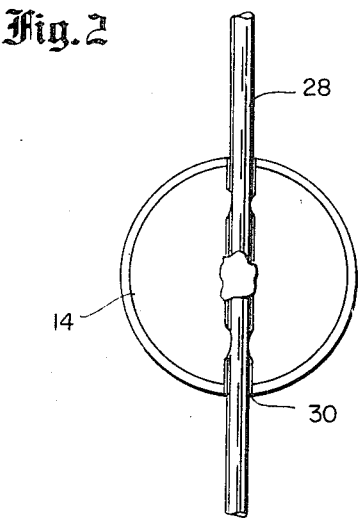
FIG. 2 is an end view of the driving pin and the measuring shaft.

Pin 28 is rigidly mounted on measuring shaft 14 in a plane approximately perpendicular to the axis of rotation. The fastening of pin 28 to measuring shaft 14 may be better understood by reference to FIGS. 2 and 3. A notch 30 having a width slightly larger than that of pin 28 is formed across the end of measuring shaft 14 by standard techniques such as milling or grinding.

Notch 30 is symmetrically located about a center of rotation of shaft 14. In assembling the device pin 28 is first inserted through drive holes 24 and 26. Next, pin 28 is placed in notch 30 so that the radial alarms of pin 28 extending in opposite directions from measuring shaft 14 are equal in length. Shaft 14 may be staked to prevent movement between shaft 14 and pin 28. Notch 30 may then be crimped or swaged over to hold pin 28 firmly. Finally, an adhesive may be applied to notch 30 and the portion of pin 28 held in notch 30 to further strengthen the joint. Pin 28 may be occasionally lubricated depending upon the amount of usage. Preferably molybdenum disulfide grease or the like is used as a lubricant.

In operation, constant rotational velocity is achieved by a constant flexing and sliding of drive pin 28 in relation to hub 18. Referring now to FIG. 4, which illustrates axial misalignment, a portion of hub 18 and pin 28 are shown at four different locations in one revolution. Point 34 is the center of rotation of measuring shaft 14. Point 36 is the center of rotation of hub 18 and input shaft 12. The distance between point 34 and point 36 is the axial misalignment between input shaft 12 and measuring shaft 14. It is exaggerated in FIG. 4 for purposes of clarity. The 0° position for the radial arm of drive pin 28 shown in FIG. 4 coincides with the zero position of hub 18. At the zero position there is no flexing of drive pin 28.

As the coupling is rotated to the 90° position, drive pin 28 is flexed by the wall of hole 24. In FIG. 4 the amount of flexure is exaggerated for clarity. Notice that, at the 90° position, the radial arm of drive pin 28 does not extend as far into hole 24 as it does at the zero position. Hole 24 and the tip of drive pin 28 are in sliding engagement as the coupling turns. Also, even though the 90° position for measuring the shaft 14 does not coincide in space with the 90° position for input shaft 12, both shafts have moved through an angle of 90°. For example, the 90° position for input shaft 12 is indicated as 90°-A and the 90° position for measuring shaft 14 is indicated as 90°-B. As the coupling is rotated to the 180° position, the radial arm of the drive pin 28 continues to slide in hole 24 to a position of minimum flexing and minimum intrusion in hole 24.

The 180° position of measuring shaft 14 coincides with the 180° position for input shaft 12. As the coupling is rotated to the 270° position, the radial arm of drive pin 28 slides to a position of maximum flexing and partial intrusion in hole 24. Note that it is flexed in the same direction with respect to center of rotation 34 at the 270° position as it is at the 90° position.

The 270° position for measuring shaft 14 did not coincide in space with the 270° position for input shaft 12. But at this position both shafts have turned through an angle of 270°. As the coupling is rotated through a revolution of 360° the amount of movement of drive pin 28 is equal to the eccentricity or misalignment between the centers of rotation, points 34 and 36.

In the discussion of the operation thus far, only one radial arm of drive pin 28 has been considered. At any of the four positions of the radial arm of drive pin 28 shown in FIG. 4, the position of the other radial arm of drive pin 28 (not shown) is identical to the position 180° removed. For example, when the radial arm of drive pin 28 is at the 90° position as shown, the other radial arm will be at the position shown at 270°. In other words, at each position the angle of flexure of one radial arm of the drive pin 28 is equal to the amount of flexure of the other radial arm. Equal flexure by the radial arms of drive pin 28 permits a constant rotational velocity of measuring shaft 14 as input shaft 12 is turned through a revolution.

Consider now the operation of the shaft coupling where it is subjected to angular misalignment. Turning now to FIG. 5, hub 18 and pin 28 are shown at one location in one revolution. Input shaft 12 and measuring shaft 14 are axially aligned but are angularly misaligned. That is, there is an angle between the axes of rotation of shafts 12 and 14. Angular misalignment between shafts 12 and 14 causes pin 28 to flex. It is to be noted that flexure of pin 28 due to angular misalignment is translational or axial. Flexure due to axial eccentricity is rotational. In FIG. 5 the amount of flexure is exaggerated for purposes of clarity. The two tips of pin 30 are held on a diameter of hub 18 by holes 24 and 26. Therefore each radial arm of pin 30 slides in its respective drive hole as a result of angular misalignment and flexes in the opposite direction from the other radial arm.

As the coupling is rotated through an angle of 90° from the position shown in FIG. 5, there will be no flexing of pin 28 due to angular misalignment of input shaft 12 and measuring shaft 14. Flexing does not occur because measuring shaft 14 is free to rotate in a plane perpendicular to the diameter of hub 18 on which holes 24 and 26 are located. In other words, the diameter of hub 18 on which holes 24 and 26 are located is also the axis of rotation of pin 28 at this particular point in a revolution of the shaft coupling. As the hub is rotated to an angle of 180° away from the position shown in FIG. 5, the position of the radial arms of pin 28 is opposite that shown in FIG. 5.

At the 180° position each tip would be flexed in the opposite direction from the zero position. Therefore, FIG. 5 could also represent the coupling at the 180° position. At the 270° position there is no flexure of pin 28 due to angular misalignment. The description regarding the 90° location stated above also applies to the operation of pin 28 at the 270° location.

What is claimed is:

1. A shaft coupling for coupling two axially and angularly misaligned shafts comprising:
   a first rotatable shaft having a crossmember mounted at one end, said crossmember having a pair of opposed flexible radial arms; and
   a hub for transmitting angular motion from a rotatable input shaft, said hub having a bore for receiving the input shaft and means for rigidly connecting said hub to the input shaft, said hub having a pair of diametrically opposed holes, each of said holes adapted to receive one of said radial arms of said crossmember in sliding engagement to torque said first shaft through an angle substantially equal to an angle of rotation of the input shaft.

2. A device as claimed in claim 1 wherein said crossmember comprises a flexible wire.

3. A device as claimed in claim 2 wherein said flexible wire is flexible in a rotational direction.

4. A device as claimed in claim 2 wherein said flexible wire is flexible in an axial direction.

5. A device as claimed in claim 1 wherein said means for rigidly connecting said hub to an input shaft comprises at least one setscrew.

6. A shaft coupling for coupling two angularly and axially misaligned rotating shafts comprising:
   a first rotatable shaft for transmitting rotary motion;
   means for rotating said first rotatable shaft;
   a second rotary shaft for receiving angular motion, said second shaft having a crossmember mounted on one end, said crossmember having a pair of opposed, flexible radial arms;
   means for measuring angular motion mounted on said second shaft to rotate therewith; and
   a hub having a bore mounted on said first shaft for transmitting angular motion to said second shaft, said hub having a pair of drive holes at opposite ends of a diameter of said bore, each of said drive holes adapted to receive a radial arm of said crossmember in sliding engagement, and said pair of drive holes flexing said pair of radial arms equally whereby said second shaft is torqued through an angle substantially equal to an angle of rotation of said first shaft.

* * * * *

UNITED STATES PATENT OFFICE
CERTIFICATE OF CORRECTION

Patent No. 3636728            Dated    January 25, 1972

Inventor(s) Ralph E. Walker

It is certified that error appears in the above-identified patent and that said Letters Patent are hereby corrected as shown below:

Column 3, line 16 - alarms - should be arms

Signed and sealed this 12th day of December 1972.

(SEAL)
Attest:

EDWARD M. FLETCHER, JR.
Attesting Officer

ROBERT GOTTSCHALK
Commissioner of Patents